United States Patent

[11] 3,586,054

| [72] | Inventor | Ronald G. Michael<br>West Burlington, Iowa |
|---|---|---|
| [21] | Appl. No. | 821,420 |
| [22] | Filed | May 2, 1969 |
| [45] | Patented | June 22, 1971 |
| [73] | Assignee | J. I. Case Company<br>Racine, Wis. |

[54] TRANSMISSION CONTROL VALVE
16 Claims, 6 Drawing Figs.

[52] U.S. Cl. .................................................... 137/625.68
[51] Int. Cl. .................................................... F16k 11/07
[50] Field of Search ........................................ 137/625.68; 74/DIG. 1

[56] References Cited
UNITED STATES PATENTS

| 3,004,555 | 10/1961 | Haberland | 137/625.68 |
| 3,207,182 | 9/1965 | Edmunds | 137/625.68 |
| 3,274,858 | 9/1966 | Meyer et al. | 74/DIG. 1 |
| 3,293,934 | 12/1966 | Schaefer et al. | 74/DIG. 1 |

Primary Examiner—Henry T. Klinksiek
Attorney—Dressler, Goldsmith, Clement and Gordon ABSTRACT: A control valve for selectively controlling the flow of fluid to and from a plurality of fluid operated devices. The valve includes a valve spool having pressure and return flow paths respectively connected to a reservoir and a fluid source and conduits communicating with the valve chamber in selected groups and at circumferentially spaced locations so that a plurality of devices may be simultaneously actuated from a single fluid source. The control valve also includes a separate group of conduits intersecting the chamber with a single transverse opening adapted to allow flow through the valve when the spool is in selected conditions.

PATENTED JUN 22 1971

INVENTOR
Ronald G. Michael
BY Dressler, Goldsmith, Clement & Gordon
ATTORNEYS

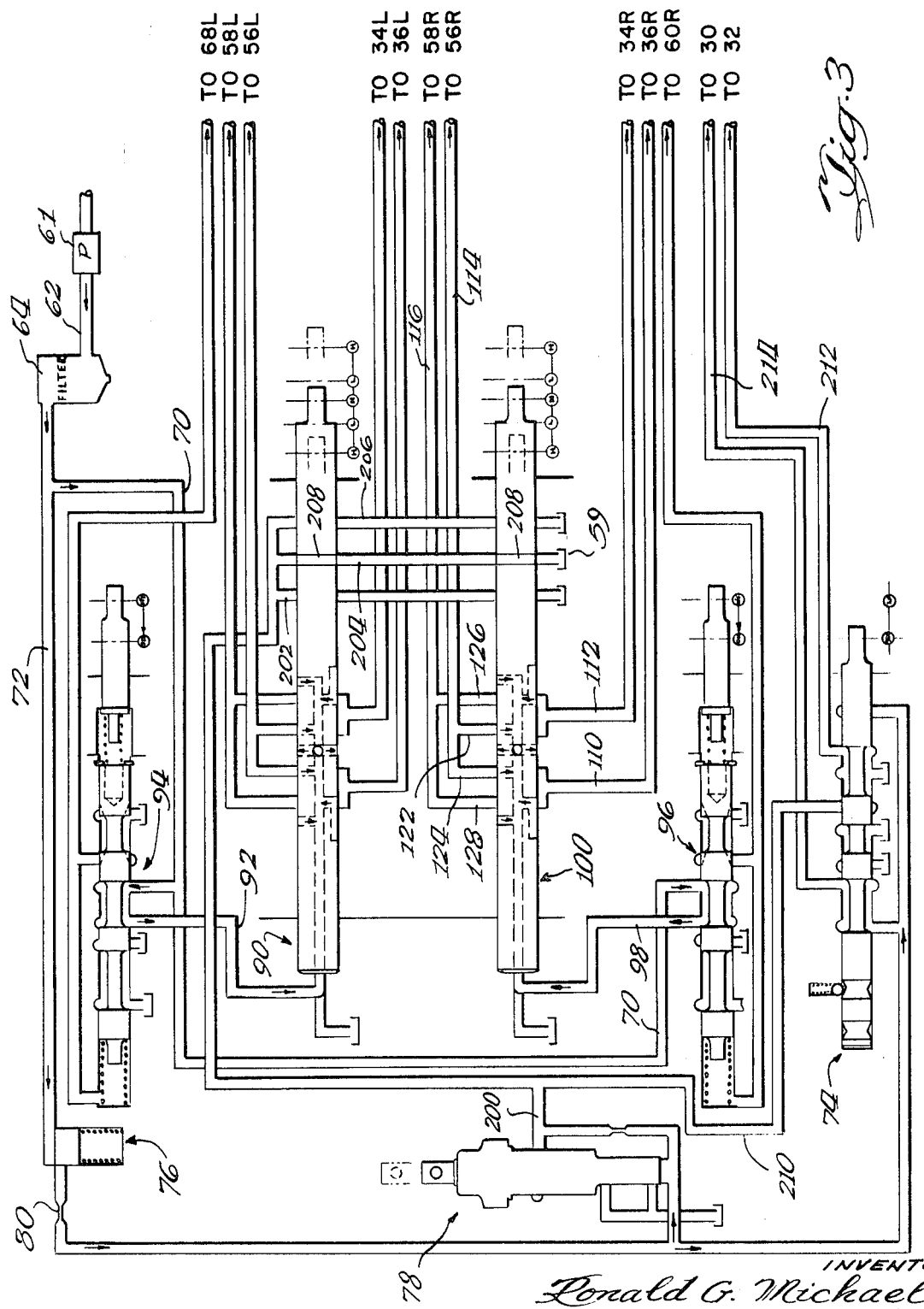

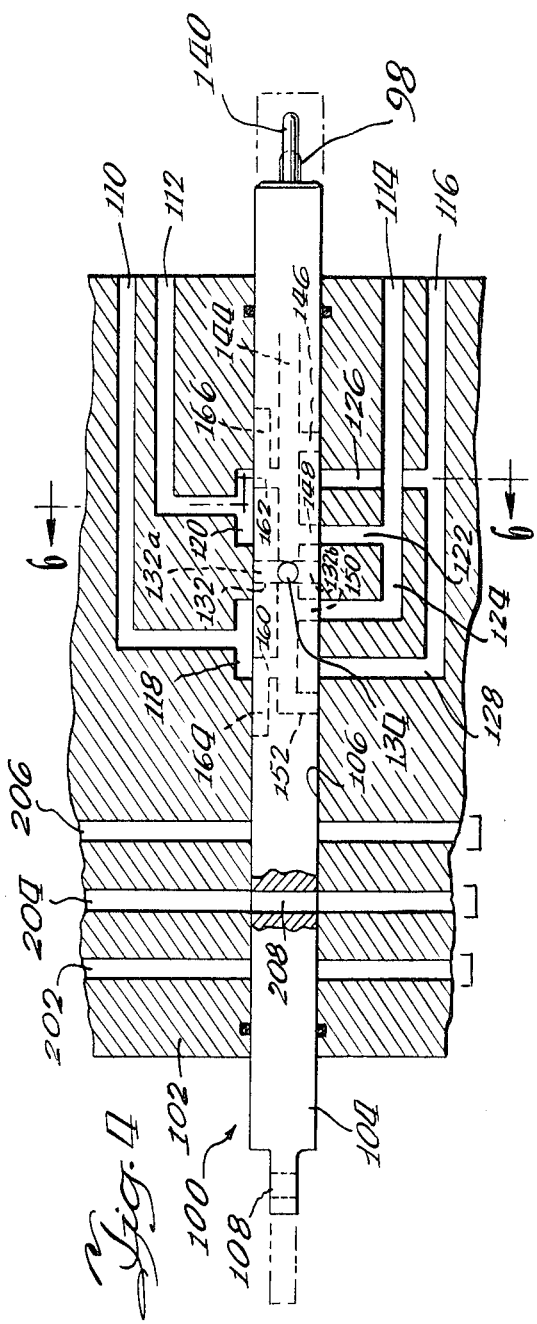
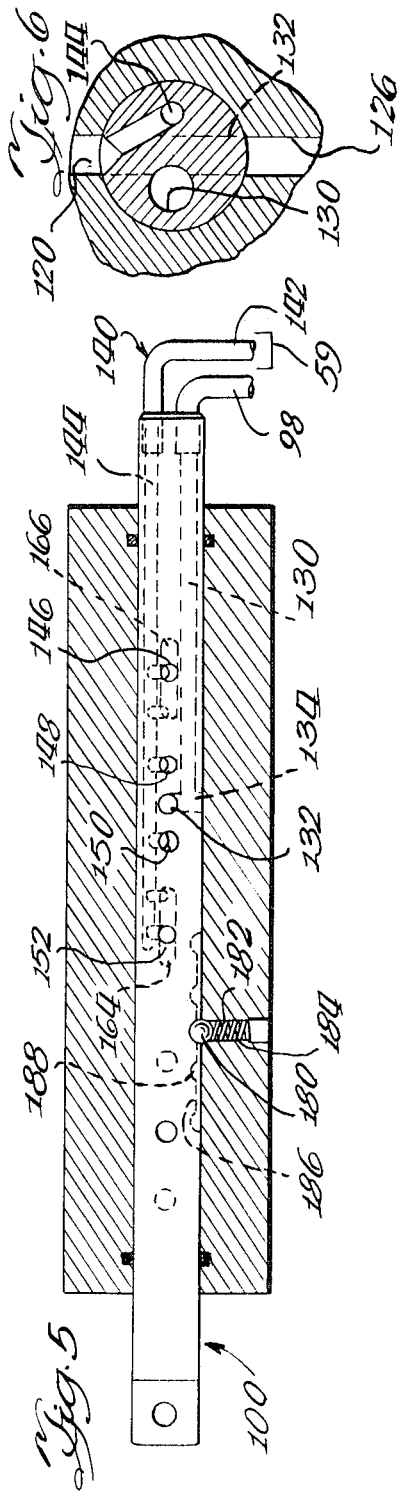

3,586,054

TRANSMISSION CONTROL VALVE

BACKGROUND OF THE INVENTION

The present invention relates generally to hydraulic control systems and more particularly to an improved hydraulic control valve for selectively supplying fluid to a plurality of fluid operated devices forming part of a hydraulic fluid system.

While the invention disclosed herein may be utilized in various types of vehicles and other power units, it is believed that it has particular utility in connection with crawler-type tractors and, therefore, such an environment will be utilized in describing the present invention.

Generally, crawler-type tractors have heretofore been maneuvered by braking the drive to one of the tracks in order to pivot the unit about that track. However, maneuvering in this manner requires considerable space and dexterity of the operator. Also, it is virtually impossible to maneuver the vehicle within close quarters and the braking method of turning results in a rather jerky motion of the tractor during such maneuvering operations.

Recently, transmissions for crawler-type tractors have incorporated hydraulically operated fluid couplings which allow maneuvering of the vehicle by selective engagement and disengagement of the associated clutches forming part of the transmission. Such a hydraulic control circuit for controlling a transmission is disclosed in Baker, U.S. Pat. No. 3,017,941.

While the patented hydraulic control circuit for a crawler-type tractor has overcome most of the objections regarding the maneuverability of a machine of this type, there still remains a need for a fluid control system which is capable of shifting the transmission between various speed and direction ratios which can readily be operated in a simple and effective manner.

SUMMARY OF THE INVENTION

Therefore, it is a primary object of the present invention to provide an improved control valve for selectively controlling the flow of fluid to a plurality of fluid couplings. Another object of the invention is to provide an improved hydraulic control circuit for a transmission which incorporates a single control valve for simultaneously engaging a plurality of fluid couplings.

Other objects and advantages of the present invention will become apparent from the following detailed description when taken in conjunction with the accompanying drawings.

BRIEF DESCRIPTION OF DRAWINGS

FIG. 3 is a schematic illustration of the hydraulic control circuit for the transmission unit shown in FIG. 2 and incorporating the details of the present invention;

FIG. 4 is a horizontal sectional view of the control valve of the present invention;

FIG. 5 is a vertical sectional view of the control valve of the present invention; and FIG. 6 is a sectional view taken generally along line 6—6 of FIG. 4.

DETAILED DESCRIPTION

Figure 1:
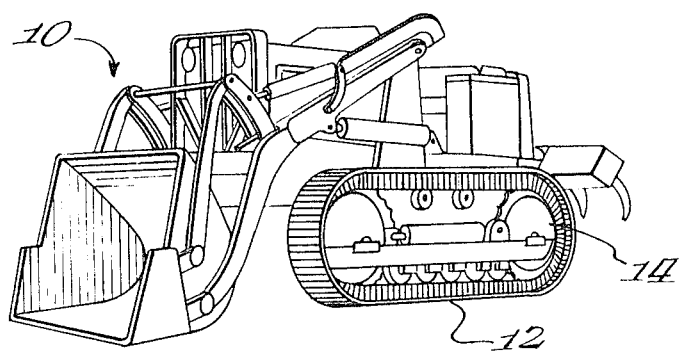
FIG. 1 is a perspective view of a vehicle which is capable of having the present invention incorporated therein.

FIG. 1 of the drawings discloses a crawler-type tractor 10 having endless tracks 12 driven by drive sprockets 14. The tractor also has earth working implements supported thereon which need not be described in detail since they form no part of the present invention.

Figure 2:
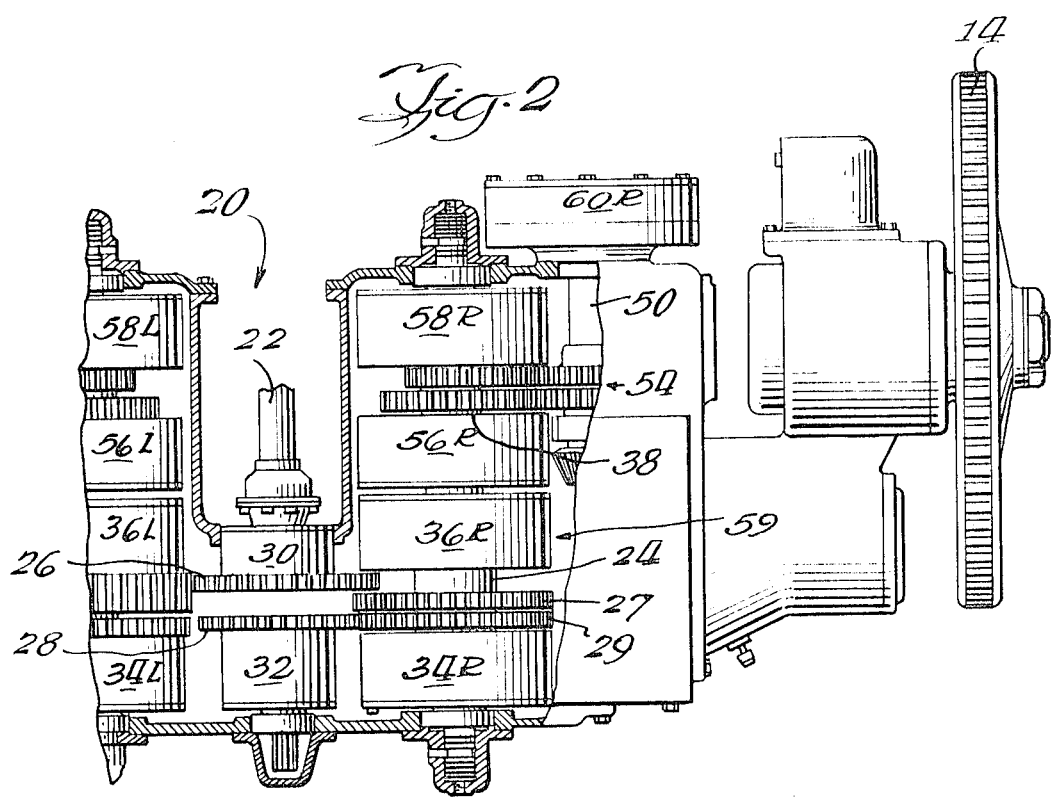
FIG. 2 is a fragmentary plan view partially in section of a transmission unit incorporated in the vehicle shown in FIG. 1.

FIG. 2 of the drawings discloses a transmission unit of the type disclosed in Gerst et al. U.S. Pat. No. 2,866,360. The transmission 20 is generally symmetrical with respect to an input shaft 22 and, thus, only one half of the transmission will be described in detail.

The input shaft 22 is operatively connected to intermediate or lay shafts 24 through gears 26 and 28 in mesh with gears 27 and 29 and which are selectively connected to the input shaft by a pair of clutches or fluid couplings 30 and 32. Thus, engagement of either of the fluid couplings 30 or 32 will cause a corresponding rotation of countershafts 24 in response to rotation of drive shaft 22. The drive shaft 22, as in all vehicles of this type, is connected to an engine (not shown in detail).

The respective gears 27 and 29 are freely rotatable on countershaft 24 and are adapted to be operatively connected thereto by forward and reverse clutches 34 and 36 which have clutch elements respectively connected to the gears and to the countershaft 24. In this manner, a further countershaft 38 may be rotated in either direction and at two different ranges depending upon the engagement of either fluid coupling 30 or 32 and fluid coupling 34 or 36.

The drive sprocket 14 is suitably connected to a further countershaft 50 through suitable gearing and shafts carried within housing 52 and forming the final drive means for one side or endless track 12 of the tractor 10. In the illustrated embodiment, the countershaft 50 is adapted to be driven through gearing 54 at two different speed ranges with respect to countershaft 38 by selective engagement of the low range clutch or fluid coupling 56 and the high range clutch or fluid coupling 58. A further fluid coupling 60 cooperates with shaft 50 to define a braking mechanism for one side of the crawler tractor. For purpose of clarity, the respective fluid couplings 34, 36, 56, 58 and 60 have been designated by "L" and "R" for indicating left and right-hand couplings for the transmission.

Since all of the elements with the exception of the improved fluid couplings 30 and 32 are identical to those disclosed in the above mentioned Gerst et al. patent, any further details regarding the construction and operation of the transmission unit may be obtained by review of said patent.

HYDRAULIC CONTROL CIRCUIT

The hydraulic control circuit which embodies the control valve of the present invention is generally disclosed in FIG. 3 and includes a pump 61 connected to reservoir 59 and supplying pressured fluid to an outlet conduit 62 through a filtering device 64. The pressured fluid in conduit 62 is directed to branch conduits 70 and 72 with conduit 72 supplying pressured fluid to a range control valve 74 which selectively engages fluid coupling 30 or 32 to condition the transmission for operation in either a high or a low range.

The conduit 72 includes a priority valve 76 and a modulating valve 78 as well as a restricted orifice 80 to restrict the flow to range control valve 74. The priority or regulating valve 76 blocks flow in conduit 72 until all of the selected clutches 30, 32, 56 and 58 for a particular speed and direction condition are in engaged position and which is accomplished by pressured fluid flow through the conduit 70. Thus, conduit 70 supplies pressured fluid to left-hand track control valve means 90 through a conduit 92 which leads from conduit 70 and passes through left-hand brake control valve 94. Conduit 70 also supplies pressured fluid to right-hand brake control valve 96 and to right-hand valve control means 100 by a conduit 98 leading from the right-hand brake control valve 96. By having all of the fluid for the respective direction and speed control clutches or fluid couplings passing through the respective brake control valves, the hydraulic control system insures a neutralization of the transmission control unit or drive unit for each track whenever the associated brake is operated, as is disclosed in the above Baker patent.

According to the present invention, the supply of pressured fluid to all of the fluid couplings for each of the respective final drive units for the tractor are controlled by individual control valves 90 and 100. Thus, the operator need only be concerned with the movement of one control valve spool for each track. Since control valves 90 and 100 are identical in construction, only one of the valves will be described in detail.

The control valve 100 for supplying pressured fluid to the respective fluid couplings 34R, 36R, 56R, and 58R is shown in FIG. 4 through 6 and includes a valve housing 102 having a valve spool 104 slidable in a valve chamber or bore 106. The valve spool is adapted to be moved between a plurality of neutral and engaged positions by a manual control lever (not shown) disposed in the operator's compartment of the vehicle or tractor 10 and connected through suitable linkage to a reduced area portion 108 defined on one end of the valve spool 104.

The valve housing 102 has a plurality of conduits 110, 112, 114 and 116 defined therein which respectively communicate with fluid couplings 36R, 34R, 56R and 58R. The conduits 110 and 112 communicate with valve chamber or bore 106 at axially spaced points which are in circumferential alignment with each other and have enlarged recesses 118 and 120 defined on the inner ends thereof at the point of merger with the valve chamber or bore.

The conduit 114 communicating with fluid coupling or clutch 56R is in communication with the valve chamber or bore 106 at axially spaced points through branch conduits 122 and 124 while conduit 116 is in communication with valve bore 106 through branch conduits 126 and 128. The respective branch conduits 122 through 128 again communicate with the valve bore 106 at axially spaced points which are in circumferential alignment on the wall or surface defining the bore 106. Thus, the conduits 110 and 112 define a first group of conduits while conduits 114 and 116 and the associated branch conduits define a second group of conduits with the respective groups being in isolated communication with the chamber by being located at diametrically opposed points on the valve bore.

According to another aspect of the present invention, the pressured fluid flow and the connection of the respective conduits to the reservoir 59 is directed through the valve spool 104. For this purpose, the valve spool incorporates means defining first and second fluid flow paths or conduit means respectively communicating with the pressured fluid source and with the reservoir. The means defining the pressured fluid flow path includes an axially extending bore or opening 130 which has the conduit 98 connected thereto at one end thereof. The axially extending bore or opening 130 communicates at its inner end with a transversely extending opening 132 which defines diametrically opposed exits or outlets 132*a* and 132*b* for the pressured fluid received in the axially extending opening or conduit means 130. Since the opening 130 is offset from the center of the valve spool 104, a further opening 134 interconnects the openings 130 and 132 and extends from the peripheral surface of the valve spool to the transversely extending opening 132.

As shown in FIG. 4, the diametrically opposed outlets 132*a* and 132*b* defined by transversely extending opening 132 are in circumferential or longitudinal alignment with the point of communication of the respective groups of conduits. Thus, pressured fluid is capable of being supplied to each group of conduits while the valve spool blocks flow between the respective groups of conduits.

As was indicated above, the means for connecting the reservoir to the various conduits is also incorporated in the valve spool and includes a further conduit means 140 including a conduit 142 communicating at one end with the reservoir 59 and at its opposite end with an axially extending bore 144 defined within the valve spool and isolated from the axially extending bore 130. As more clearly shown in FIG. 4, the conduit means or flow path 140 has a plurality of transversely extending openings or outlets 146, 148, 150 and 152 extending to one side of the valve spool and in alignment with the respective branch conduits 126, 122, 124 and 128. The axial spacing between the respective outlets or ports 146 through 152 is such that selected ones of the plurality of branch conduits are in communication with the reservoir at certain positions of the valve spool with respect to the valve chamber, in a manner which will be described in more detail hereinafter.

The means defining the flow path 140 further includes a pair of transversely extending and axially spaced openings 160 and 162 respectively having enlarged recesses 164 and 166 on the peripheral surface of the valve spool. The elongated recesses 164 and 166 are again in circumferential alignment with each other and are axially spaced in an appropriate manner to be selectively in communication with the respective enlarged recesses 118 and 120 defined on the ends of the conduits 110 and 112.

The valve spool is shown in the neutral position in FIGS. 3 and 4 so that both conduits 110 and 112 are connected to the reservoir 59 while branch conduits 122 and 124 leading from conduit 114 connected to the low range fluid coupling 56R are in communication with the reservoir. In this position, the opening or inlet of pressured fluid to the control valve is disposed between the respective recesses 118 and 120 as well as between branch conduits 122 and 124 so that the flow of pressured fluid is blocked by the valve bore or chamber 106.

Assuming that the operator wishes to condition the right-hand track for operation at the low forward speed, it is only necessary for him to manipulate the single control lever thereby shifting the valve spool leftward as viewed in FIG. 4, to place transverse opening 132 having the respective outlets in transverse alignment with branch conduit 124 and elongated recess 118 thereby supplying pressured fluid through conduits 110 and 114 to fluid couplings 36R and 56R. At the same time, the transverse outlet or port 146 will be in alignment with branch conduit 126 to connect the high range clutch 58R to the reservoir 59. This will condition the operation of the right-hand track for movement in the lowest of the forward speeds when the range control valve 74 is moved to either of two positions for supplying pressured fluid to either fluid coupling 32 or 30.

Subsequently, if the operator desires to condition the right-hand track for operation at the high forward speed, it is only necessary for him to move the valve spool leftward from the position described above. During this movement, the one outlet port or opening 132*a* communicating with conduit 110 will continue to supply pressured fluid to the forward clutch or fluid coupling 34R while the opposed pressured fluid outlet or port will be placed in communication with branch conduit 128 to supply pressured fluid to the high range fluid coupling 58R.

Movement of the valve spool in the right-hand direction as viewed in FIG. 4 and from the neutral position shown will condition the right-hand track for reverse operation in either of the low or the high speeds.

Thus, it can be seen that the valve spool or control valve of the present invention provides means for simultaneously supplying pressured fluid to a plurality of fluid couplings while connecting the remainder of the fluid couplings to the reservoir. This is accomplished with a minimum number of conduits being provided within the valve housing and communicating with the chamber. Heretofore, in most instances, it was considered necessary to provide a separate fluid pressure source to the valve chamber for each of the desired fluid couplings to be operated at one time. Thus, for example, if it were desired to provide pressured fluid to two fluid couplings simultaneously when the valve spool is in one position, it was necessary to supply pressured fluid sources at spaced points along the valve chamber. Thus, it can seen that the present control valve provides a simple and efficient manner of controlling the supply of pressured fluid to a plurality of fluid operated devices.

According to another aspect of the present invention, the control valve spool is maintained in oriented relationship with respect to the valve chamber or bore 106 by mechanism which holds the valve spool in the plurality of neutral or engaged positions. The mechanism for maintaining the valve spool in any one of a plurality of positions includes a ball 180 slidably disposed in a transverse opening 182 formed on the valve housing 102 and communicating with valve bore 106. The ball is spring biased into engagement with the valve spool 104 by a spring 184. The mechanism for maintaining orientation includes an elongated recess 186 defined on the valve spool and receiving the ball 180. The recess has a plurality of indentations 188 formed therein which define the respective positions of the valve spool with respect to the chamber. Thus, the spring biased ball 180 not only defines the various positions of the valve spool but also provides proper orientation of the valve spool with respect to the housing so as to insure that the outlet ports 132a and 132b as well as the various reservoir ports are in proper circumferential alignment with the respective conduits communicating with the chamber.

According to a further aspect of the present invention, the valve spool also incorporates mechanism for controlling the modulation of pressured fluid in conduit 72 which leads to the range control valve 74. Since the construction and operation of the modulating valve is described and claimed in copending application Ser. No. 837,547 filed on June 30, 1969 by Robert G. Honeyager and James C. Rigney for "Transmission Control System" and assigned to the assignee of the present invention, a detailed description of the modulating valve does not appear to be necessary. However, as described in the above mentioned application, the modulating valve modulates flow of pressured fluid in conduit 72 in response to having a conduit 200 communicating with the reservoir. Thus, the conduit 200 is adapted to be placed in communication with the reservoir 59 whenever both valve spools of control valves 90 and 100 are in predetermined condition. This is accomplished by having a plurality of conduits 202, 204 and 206 connected to conduit 200 and intersecting the valve chambers 106 of both control valves 90 and 100. A single transversely extending opening 208 is defined on each valve spool 104 and is adapted to allow fluid flow through one of the branch conduits 202, 204 or 206, whenever both valve spools are in any one of a plurality of predetermined conditions. Thus, for example, if both of the valve spools 104 are in the neutral condition, transversely extending openings 208 will provide a flow path through branch conduit 204 thereby connecting conduit 200 to the reservoir 59.

The remaining two branch conduits 202 and 206 will selectively place conduit 200 in communication with the reservoir when both of the control valve spools are moved between the low and high speed of each track in either the forward or reverse position.

The conduit 200 is also capable of being connected to the reservoir whenever the range control valve 74 is moved between the two operating positions. This is accomplished by a branch conduit 210 extending to the valve chamber of range control valve 74 and adapted to be connected to the reservoir 59 whenever the valve spool is moved between the two operating positions. In either of the operating positions, the range control valve selectively supplies pressured fluid through conduits 212 and 214 to the respective range control clutches or fluid couplings 30 and 32.

As can be appreciated, the present invention provides a simple and efficient manner of controlling the flow of pressured fluid simultaneously to a plurality of fluid operated clutches.

While an illustrative embodiment of the invention has been described, it is apparent that many changes could be made in the specific structure described and still perform the same function. For example, the recesses 118 and 120 have been shown as being located on the end of the respective conduits 110 and 112. These two recesses could readily be replaced by a single recess defined on the valve spool and communicating with the outlet 132a. The single elongated recess would simplify the construction of the particular valve spool and chamber since it would be much more efficient to provide the elongated recess on the valve spool rather than the two recesses on the valve chamber.

Also, the flow path leading to the reservoir has been illustratively shown as only placing the low range clutch or fluid coupling 56R in communication with the reservoir when the control valve is in the neutral condition. However, both the low and high range fluid couplings 56R and 58R could be in communication with the reservoir in the neutral position by providing elongated recesses on the outlets or ports 146 and 152 so that either or both branch conduits 126 and 128 would be in communication with the reservoir when the valve spool is in the neutral condition.

Also, while only two clutches have been illustrated as being engaged by supplying pressured fluid through the valve spool, it is readily apparent that any number of such clutches could simultaneously be engaged by providing a single pressured fluid source to the valve spool. For example, two perpendicularly disposed openings 132 could be provided at one axial point on the valve spool and four groups of conduits could be radially disposed at 90° on the valve chamber. This would allow for simultaneous supply of pressured fluid to four clutches from a single source. Also, any number of groups of conduits could be axially spaced from each other and a separate supply or transversely extending opening could be provided for each group with a single elongated bore or opening extending through the valve spool and simultaneously communicating with the plurality of transversely extending openings.

What I claim is:

1. A control valve for supply pressured fluid to a plurality of fluid conduits and comprising a valve housing having an elongated valve bore therein with a plurality of conduits leading from said bore and a valve spool longitudinally movable in said bore, the improvement of said conduits respectively communicating with said bore at isolated points, a pressured fluid source, and means defining a flow path from one end of said valve spool, said source being connected to said flow path at said end of said spool for simultaneously supplying pressured fluid to two of said conduits.

2. A control valve as defined in claim 1, in which said flow path includes first means defining an axial first opening terminating at an inner end intermediate opposite ends of said valve spool and second means defining a second opening in said valve spool angularly related to said first opening and communicating therewith, said second opening merging with the surface of said spool at circumferentially spaced points.

3. A control valve as defined in claim 2, including the further improvement of said second opening extending perpendicular to the axis of said valve spool with said at least two conduits communicating with said bore at transversely aligned points.

4. A control valve for supplying pressured fluid to a plurality of fluid conduits and comprising a valve housing having an elongated valve bore therein with at least of conduits leading from said bore, one of said conduits communicating with one side of said bore and said second and third conduits communicating at longitudinally spaced points on an opposite side of said bore; means defining an elongated recess on said one side and communicating with said first conduit, said recess having opposite ends substantially in transverse alignment with the respective second and third conduits; a valve spool longitudinally movable within said bore; a pressured fluid source; and means defining a flow path in said valve spool and connected to said source for simultaneously supply pressured fluid to two of said conduits, said flow path having a transversely extending opening defining outlets on opposite sides of said spool, one of said outlets aligned with said recess and the other of said outlets aligned with said second and third conduits whereby axial shifting of said valve spool will simultaneously supply pressured fluid to two of said conduits.

5. A control valve as defined in claim 4, including the further improvement of a reservoir, and means defining a second flow path in said valve spool and communicating with said reservoir, said second flow path having axially spaced ports on said valve spool whereby to connect the third of said conduits to said reservoir while pressured fluid is being supplied to two of said conduits.

6. A control valve for supplying pressured fluid to a plurality of fluid conduits and comprising a valve housing having an elongated valve bore therein with six conduits leading from said bore, a first group of four conduits communicating with said bore at longitudinally aligned, spaced points, a second group of two conduits communicating with said bore at longitudinally aligned, spaced points and spaced from the communication of said four conduits; a valve spool longitudinally movable in said bore; a pressured fluid source; and means defining a flow path in said valve spool and connected to said source, said flow path having spaced outlets on said valve spool respectively aligned with said groups to simultaneously supply pressured fluid to at least one conduit of each of said groups.

7. A control valve as defined in claim 6, including the further improvement of a reservoir and longitudinal conduit means defining in said spool and connected to said reservoir, said conduit means having a plurality of outlets located on the exterior of said valve spool to connect at least one conduit of each group to said reservoir while another of said conduits is connected to said source.

8. A control valve as defined in claim 7, and wherein said valve bore and spool are circular, and said valve spool includes a plurality of engaged positions the further improvement of said first and second group of conduits being diametrically opposed, said flow path comprising an axial first opening and a transversely extending second opening defining diametrically opposed outlets, one of said outlets communicating with a conduit of said first group in any one of said engaged positions and means defined on one of said bores and valve spool for connecting each conduit of said second group to the associated outlet during a plurality of engaged positions of said valve spool.

9. In a hydraulic control circuit for selectively supplying pressured fluid to a plurality of fluid operated devices and including pressured fluid source, a reservoir, a valve chamber having a valve spool axially slidable therein and a plurality of conduits connecting said chamber to said devices, the improvements of said conduits arranged in groups with each group in isolated communication with said chamber, first conduit means in said valve spool and connected to said source with an exit on said valve spool for each group of conduits, and means defining second conduit means in said valve spool and connected to said reservoir, said second conduit means having a plurality of outlets for each group whereby shifting of said valve spool will selectively supply pressured fluid to one of said conduits of each group and connect at least one of the conduits of each group to said reservoir.

10. A hydraulic control circuit as defined in claim 9, including the further improvement of said first conduit means including an axially extending bore in said spool with transversely extending openings communicating with said bore and respectively aligned with one of said groups of conduits and said second conduit means includes a second axially extending bore isolated from said first bore and having transversely extending outlets for each group equal in number to the number of conduits in each group.

11. A hydraulic control circuit as defined in claim 9, and wherein said valve spool has a plurality of engaged positions, the further improvement of means on one of said valve spool and chamber for connecting one exit to each of the conduits of one of said groups in a plurality of engaged positions of said spool.

12. A hydraulic control circuit as defined in claim 9, including the further improvement of said groups comprising first and second groups of conduits in diametrically opposed communication with said chamber with conduits of each group having communication with said chamber at axially spaced and circumferentially aligned points and said first conduit means includes means defining a transverse opening through said spool and an elongated opening in said spool communicating with said source and said transverse opening.

13. A hydraulic control circuit as defined in claim 9, including the further improvement of a plurality of further conduits intersecting said valve chamber at axially spaced points, and means defining a transverse opening in said valve spool and selectively providing communication in respective ones of said further conduits when said valve spool is in predetermined conditions.

14. A hydraulic control circuit for selectively supplying pressured fluid to a plurality of fluid operated devices and including a valve spool slidably in a valve chamber and movable to a plurality of positions, at least first, second and third conduits leading from said valve chamber, a pressured fluid source and a reservoir, the improvement of means defining first and second fluid flow paths in said valve spool with said source and reservoir connected to respective flow paths, said first flow path having spaced exits on the peripheral surface of said valve spool, said first conduit communicating with one of said exits while said valve spool is in two of said positions and said second and third conduits respectively communicating with another of said exits and with said second flow path when said valve spool is in either of said two positions whereby to simultaneously selectively supply pressured fluid to two of said conduits and connect a third of said conduits to said reservoir.

15. A hydraulic control circuit as defined in claim 14, and wherein said system selectively supplies pressured fluid to at least four fluid operated devices with said first, second, and third conduits each connected to a fluid operated device, the improvement of fourth conduit connected to said fourth fluid operated device with said first and fourth conduits communicating with said chamber at axially spaced points and in circumferential alignment and said second and third conduits respectively having a plurality of branch conduits with all said branch conduits axially spaced from each other and communicating with said valve chamber at axially spaced points and diametrically opposed from said first conduit.

16. A hydraulic control circuit as defined in claim 14, including the further improvement of means cooperating with said valve chamber and valve spool for maintaining said valve spool in oriented position with respect to said valve chamber.

PO-1050
(5/69)

UNITED STATES PATENT OFFICE
CERTIFICATE OF CORRECTION

Patent No. 3,586,054　　　　　　　Dated June 22, 1971

Inventor(s) Ronald G. Michael

It is certified that error appears in the above-identified patent and that said Letters Patent are hereby corrected as shown below:

Column 4, line 62, after "can" insert -- be --.

Column 6, line 47, change "of" to -- three --.

Signed and sealed this 9th day of November 1971.

(SEAL)
Attest:

EDWARD M. FLETCHER, JR.　　　　　　ROBERT GOTTSCHALK
Attesting Officer　　　　　　　　　Acting Commissioner of Patents